(12) United States Patent
Horton, Jr.

(10) Patent No.: US 8,683,707 B1
(45) Date of Patent: Apr. 1, 2014

(54) MAGNETICALLY MODULATED LOCATION SYSTEM

(75) Inventor: Claude W. Horton, Jr., Austin, TX (US)

(73) Assignee: Mike Alexander Horton, Mountain View, CA (US)

( * ) Notice: Subject to any disclaimer, the term of this patent is extended or adjusted under 35 U.S.C. 154(b) by 197 days.

(21) Appl. No.: 13/433,079

(22) Filed: Mar. 28, 2012

(51) Int. Cl.
*G01C 17/00* (2006.01)

(52) U.S. Cl.
USPC ........................................ 33/355 R

(58) Field of Classification Search
USPC ................. 33/355 R, 356, 361, 362, 363 R
See application file for complete search history.

(56) References Cited

U.S. PATENT DOCUMENTS

| | | | |
|---|---|---|---|
| 3,983,474 A | 9/1976 | Kuipers | |
| 4,017,858 A | 4/1977 | Kuipers | |
| 5,307,072 A | 4/1994 | Jones, Jr. | |
| 5,453,686 A | 9/1995 | Anderson | |
| 5,615,132 A | 3/1997 | Horton | |
| 5,640,170 A | 6/1997 | Anderson | |
| 5,819,206 A | 10/1998 | Horton | |
| 6,225,905 B1 | 5/2001 | Tyren | |
| 6,243,660 B1 | 6/2001 | Hsu | |
| 6,261,247 B1 * | 7/2001 | Ishikawa et al. | 33/700 |
| 6,369,564 B1 | 4/2002 | Khalfin | |
| 6,377,041 B1 | 4/2002 | Jones, Jr. | |
| 6,400,139 B1 | 6/2002 | Khalfin | |
| 6,417,771 B1 | 7/2002 | Tyren | |
| 6,624,626 B2 | 9/2003 | Khalfin | |
| 6,762,600 B2 | 7/2004 | Khalfin | |
| 7,104,129 B2 | 9/2006 | Nasiri | |
| 7,154,447 B2 | 12/2006 | Copeland | |
| 7,250,112 B2 | 7/2007 | Nasiri | |
| 7,258,011 B2 | 8/2007 | Nasiri | |
| 7,292,948 B2 | 11/2007 | Jones, Jr. | |
| 7,382,253 B2 | 6/2008 | Oliveras | |
| 7,451,549 B1 | 11/2008 | Sodhi | |
| 7,710,395 B2 | 5/2010 | Rodgers | |
| 7,733,077 B1 * | 6/2010 | Merewether et al. | 324/67 |
| 7,755,360 B1 * | 7/2010 | Martin | 324/326 |
| 7,826,999 B1 | 11/2010 | Boeen | |
| 7,835,779 B2 | 11/2010 | Anderson | |
| 7,844,415 B1 | 11/2010 | Bryant | |
| 7,873,491 B2 | 1/2011 | Higgins | |
| 7,930,148 B1 | 4/2011 | Figaro | |
| 8,032,324 B1 | 10/2011 | Bryant | |
| 2006/0238199 A1 * | 10/2006 | Larsen | 324/329 |

(Continued)

FOREIGN PATENT DOCUMENTS

JP    WO2011065127    3/2011

OTHER PUBLICATIONS

Afzal, Muhammad Haris; "Use of Earth's Magnetic Field for Pedestrian Navigation"; Ph.D. Thesis, Jul. 2011.

(Continued)

*Primary Examiner* — G. Bradley Bennett
(74) *Attorney, Agent, or Firm* — Fernandez & Associates, LLP

(57) ABSTRACT

A method and apparatus for a magnetic field dipole based transmitter and magnetic field sensor receiver to detect and/or determine the position and/or orientation of a user's receiver; in some embodiments accuracy to less than one foot is achievable; in some embodiments a receiver is located in a cellular phone. An exemplary communications protocol for a location network service is disclosed.

20 Claims, 8 Drawing Sheets

(56) References Cited

U.S. PATENT DOCUMENTS

| | | |
|---|---|---|
| 2009/0030646 A1 | 1/2009 | Jones |
| 2011/0065460 A1 | 3/2011 | Kimishima |
| 2012/0062234 A1* | 3/2012 | Mercer et al. ............... 324/326 |
| 2012/0158354 A1* | 6/2012 | Troxler ............................ 702/150 |
| 2013/0096873 A1* | 4/2013 | Rosengaus et al. ........... 702/151 |
| 2013/0113456 A1* | 5/2013 | Pearson et al. ................ 324/67 |

OTHER PUBLICATIONS

Herrera-May, Agustin, et al.; "Resonant Magnetic Field Sensors Based on MEMS Technology"; Sensors 2009, 9, 7785.

Ravaud, R., et al.;"Analytical Calculation of the Magnetic Field Created by Permanent-Magnet Rings"; IEEE Trans. Magnetics, 44, 8, Aug. 2008, 1982.

* cited by examiner

Transmitter Coordinates as LEVEL Reference Frame $M1 = \{ M1_{max}\sin(2\pi f_x t), 0, 0 \}$ $$BX = \frac{3r(M1 \cdot r) - (r \cdot r)M1}{(r \cdot r)^{5/2}}$$

Total field at receiver is $\quad B = BX + BY + BZ$

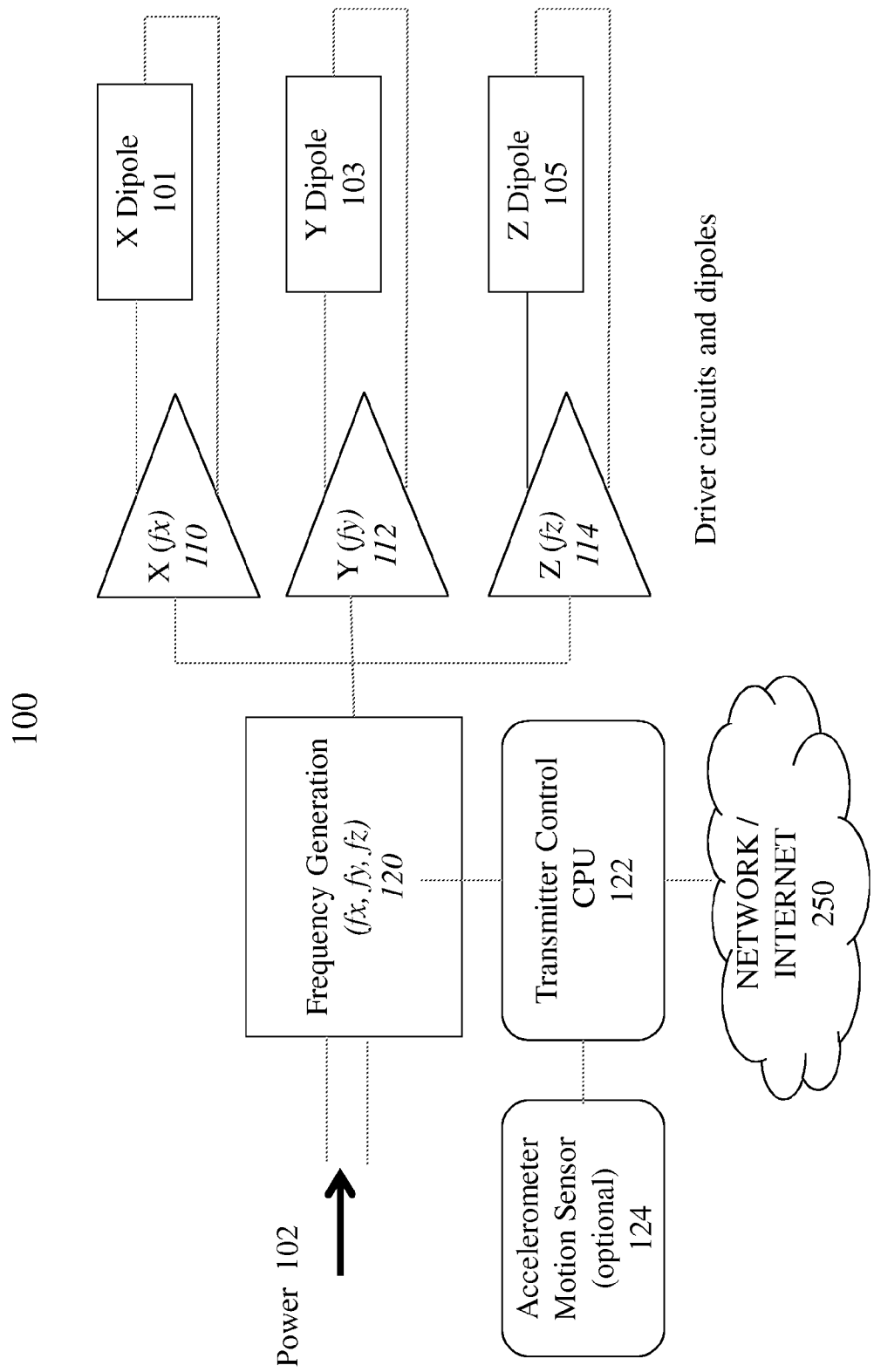

Fig. 5

ANALYSIS STEPS by RECEIVER

1. Sense Receiver composite field B in the receiver frame (x, y, z)

2. Apply FFT to each B from each sensor and determine one to three frequencies f1, f2, and f3.
   If no signal, repeat.

3. Map field data to receiver frame by estimating location, looking up dipole ID and obtaining frequency information (f1, f2, f3).
   Dipole ID used to determine mapping of fn (n = 1 to 3) to fx, fn to fy, fn to fz.

4. Organize B data into Bx, By, and Bz

5. Solve for three angles and three position datum's that comprise R and r by solving simultaneous vector equations.

6. Communicate location and orientation.

7. Optionally decode any additional communicated data in the transmitter signals

Fig. 7

COMMUNICATION PROTOCOL & STEPS

Install Step. At transmitter installation, transmitter configured with local location information, connects to network based location service and transmits secure password/key information to authenticate transmitter. Location servers replicate information to all location tables.

1. Location server sets frequencies of dipole and beacon rate. Frequencies periodically changed per random key sequence.

2. Receiver periodically monitors sensor channels for transmitter beacons.

3. Transmitter dipole periodically transmits (can also be continuously but periodic saves power)

4. Receiver detects transmitter and contacts location service with received transmitter information and frequencies.

5. Location server responds back to receiver with beacon information including beacon X,Y,Z 6. Either receiver or location computes receiver r-vector and rotation angles with respect to transmitter.

MAGNETICALLY MODULATED LOCATION SYSTEM

CROSS-REFERENCE TO RELATED PUBLICATIONS

Information providing background and explanation to the instant invention is found in the following publications: U.S. Pat. No. 3,983,474; U.S. Pat. No. 4,017,858; U.S. Pat. No. 5,307,072; U.S. Pat. No. 5,453,686; U.S. Pat. No. 5,615,132; U.S. Pat. No. 5,640,170; U.S. Pat. No. 5,819,206; U.S. Pat. No. 6,225,905; U.S. Pat. No. 6,243,660; U.S. Pat. No. 6,369,564; U.S. Pat. No. 6,377,041; U.S. Pat. No. 6,400,139; U.S. Pat. No. 6,417,771; U.S. Pat. No. 6,624,626; U.S. Pat. No. 6,762,600; U.S. Pat. No. 7,104,129; U.S. Pat. No. 7,154,447; U.S. Pat. No. 7,250,112; U.S. Pat. No. 7,258,011; U.S. Pat. No. 7,292,948; U.S. Pat. No. 7,382,253; U.S. Pat. No. 7,451,549; U.S. Pat. No. 7,710,395; U.S. Pat. No. 7,835,779; U.S. Pat. No. 7,826,999; U.S. Pat. No. 7,844,415; U.S. Pat. No. 7,873,491; U.S. Pat. No. 7,930,148; U.S. Pat. No. 8,032,324; U.S.2009/0030646; U.S.2011/0065460; WO2011065127; AFZAL, MUHAMMAD HARIS; "Use of Earth's Magnetic Field for Pedestrian Navigation"; Ph.D. Thesis, July 2011; HERRERA-MAY, AGUSTIN, ET AL.; "Resonant Magnetic Field Sensors Based on MEMS Technology"; Sensors 2009, 9, 7785; RAVAUD, R., et al.; "Analytical Calculation of the Magnetic Field Created by Permanent-Magnet Rings"; IEEE Trans. Magnetics, 44, 8, Aug. 2008, 1982. The referenced patents, articles and notes are incorporated herein in their entirety by reference.

BACKGROUND OF THE INVENTION

1. Field of the Invention

The present invention is in the field of navigation and/or location devices wherein an output of the device is the location of the device.

2. Description of Related Art

The desire to determine position, direction, and location is as ancient as human's inhabitation of the Earth. Over the course of many centuries, various systems have been developed to locate people and items with varied degrees of accuracy. To name a few, these navigation techniques include the compass, celestial navigation, GPS, and inertial navigation. Although many approaches have been considered, there is no simple, highly accurate methodology of automatic location and orientation tracking indoors at the appropriate level of sub-foot resolution required for indoor navigation applications. The present invention describes a novel method and apparatus for accurately ranging, locating, and tracking people or objects, optionally, indoors, with high precision. The invention is further benefited from its inherent compatibility and use of components already installed in many of today's mobile electronic devices and widely understood.

Probably the best known techniques for ranging, location and tracking use the time difference of arrival techniques in order to compute distances from a set of known transmitter. One example of this technique is arguably the most well known navigation system—a collection of satellites known as the Global Positioning System. The GPS systems use the speed of light as the reference to compute distance from known transmitter locations—satellites. However, it is widely known that the GPS system is unable to deliver highly accurate results indoors due to both signal attenuation and multi-path of RF signals in indoor environments. It is extremely difficult to achieve less than 3 m accuracy with a typical GPS receiver in an indoor environment. Additionally, as with other time of flight techniques, the receiver must be able to receive signals from at least 3 transmitters, in this case GPS satellites, in order to obtain a 3D position lock; this significantly reduces the availability of a solution and requires more infrastructure, e.g., satellites.

Another time of flight location system is the use of acoustic or ultrasonic beacons. These signals have the advantage of travelling slower, i.e., the speed of sound, so the time resolution required for accurate location determination is reduced. However, they also suffer from multi-path, echoes, interference from other audio or ultrasonic noise sources, e.g., fluorescent lights in the case of ultrasonic. Additionally, acoustic and ultrasonic signals are easily blocked. This means if an object is placed between the transmitter and the receiver, the receiver's ability to determine location is greatly reduced or extinguished. Again as with the GPS system, 3 transmitters are required to establish a 3D position solution. Because of the ease of blocking ultrasonic and acoustic signals, this makes reliable usage indoors with many walls and objects very problematic.

Another set of techniques employs signal strength instead of time of flight to approximate range. An example of such system is the use of signal strength from Wi-Fi access points or cellular base stations to determine location. Although signal strength from a radio transmitter such as RF is a function of distance, it is highly non-linear and unpredictable. It, therefore, is most frequently used as a coarse proximity detection of the receiver, typically to accuracies substantially lower than that of GPS. To achieve high accuracies, the use of many redundant RF transmitters or local RSSI signal mapping is required.

An additional shortcoming of both RSSI and RF-time-of-flight techniques is that no information about orientation or direction of received is contained in the transmitter signal. In order to determine orientation the use of multiple receivers co-located on the object at a separation distance is required. The accuracy of the orientation is directly related to the distance of separation, making accurate operation require significant physical separation of the receivers, which is not convenient on a small device.

There are other methods proposed and used for location determination, including the use of a camera, range finders and image processing algorithms to observe the local environment. However, these systems are complex and require user intervention, such as holding a camera or permanently affixing a camera to a helmet.

The present invention uses a fundamentally different mechanism for location determination. Instead of using time-of-flight measurement from three fixed points, this invention discloses a vector gradient, magnetic field as a transmitter or beacon, and a magnetic sensor located in proximity as a receiver. This technique has numerous advantages. As magnetic fields follow well understood and predictable gradients, precise range can be determined to sub-foot level. In addition, because the field is a vector field and the field has a distinct polarity based on position relative to the transmitter, orientation information can be extracted from the signal. In fact one transmitter can produce multiple axes of magnetic field, allowing a receiver to fully determine its 3D position and 3D orientation when in range of only one beacon as opposed to three or more. This is a significant advantage versus all of the aforementioned systems.

Due to the substantially higher accuracy of the disclosed system as compared to a the currently used techniques, a vector gradient method can be effectively utilized in conjunction with inertial navigation techniques to achieve accurate initialization and recalibration updates necessary to make inertial navigation practical in an indoor environment. This also enables a receiver to maintain accurate location and orientation information when out of range of a transmitter using hybrid inertial navigation techniques further described in the invention.

Lastly, without impacting the location accuracy performance of the disclosed system, magnetic field transmitter signals can be modulated, in frequency or amplitude or use other coding techniques, to transmit information to a receiver. Transmitted information can include a transmitter ID, transmitter location, encryption keys, local information such as on-site services available, and information to aid inertial navigation techniques for example a reference number to an online map, or the local barometric pressure for correction of altitude errors. Transmitted information further enhances the utility and ease-of-configuration of disclosed systems. A need exists for a low-cost location device with high accuracy and extended capabilities.

BRIEF SUMMARY OF THE INVENTION

In one aspect the present invention describes a method and apparatus of using up to a multi-axis, multi-frequency magnetic field dipole, field transmitter and magnetic field sensor receiver located in a mobile or portable device e.g., cellular phone, in order to detect and determine the position and/or orientation of a user, with extended range and acceptable accuracy; in some embodiments accuracy to less than one foot is achievable. In one aspect the present invention describes a method of receiving magnetically modulated fields from magnetic field dipole transmitter(s) and uniquely associating that data with a reference location on the surface of the Earth and, optionally, calculating the offset distance and orientation from the reference location. This further improvement allows a receiver/mobile device to calculate its position on the surface of the Earth. In some embodiments a system uses low frequency, modulated magnetic fields, less than 15 KHz, for instance, allowing modulated operation without FCC or regulatory approval. However, in some embodiments, it is desirable to not transmit magnetic fields as a DC signal in order to reduce effects of magnetic distortion due to ferrous materials in the environment, and easily distinguish the magnetic fields from the Earth's magnetic field, and increase the accuracy of a location system. In one aspect the present invention discloses an enhanced, multi-frequency, operation mode to improve accuracy, provide security to jamming and/or intentional interference, and establish a unique identity for each transmitter and communicate predetermined information of interest to a user.

BRIEF DESCRIPTION OF THE SEVERAL VIEWS OF THE DRAWINGS

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention. New embodiments may comprise features and/or elements found in the disclosed embodiments.

FIG. 2 is an exemplary 3-Dipole, 3-Axis Transmitter schematic diagram.

FIG. 5 shows exemplary analysis steps of a Location System receiver.

FIG. 7 shows exemplary Communication Protocol for communicating among receiver, transmitter and network, internet and cloud.

DETAILED DESCRIPTION OF THE INVENTION

In the following description, numerous specific details are set forth to provide a thorough understanding of the present invention. However, it will be apparent to one of ordinary skill in the art that the invention may be practiced without these particular details. In other instances, methods, procedures, and components that are well known to those of ordinary skill in the art are not described in detail to avoid obscuring aspects of the present invention.

Transmitter/Vector Field Gradient Generator

Figure 1A:
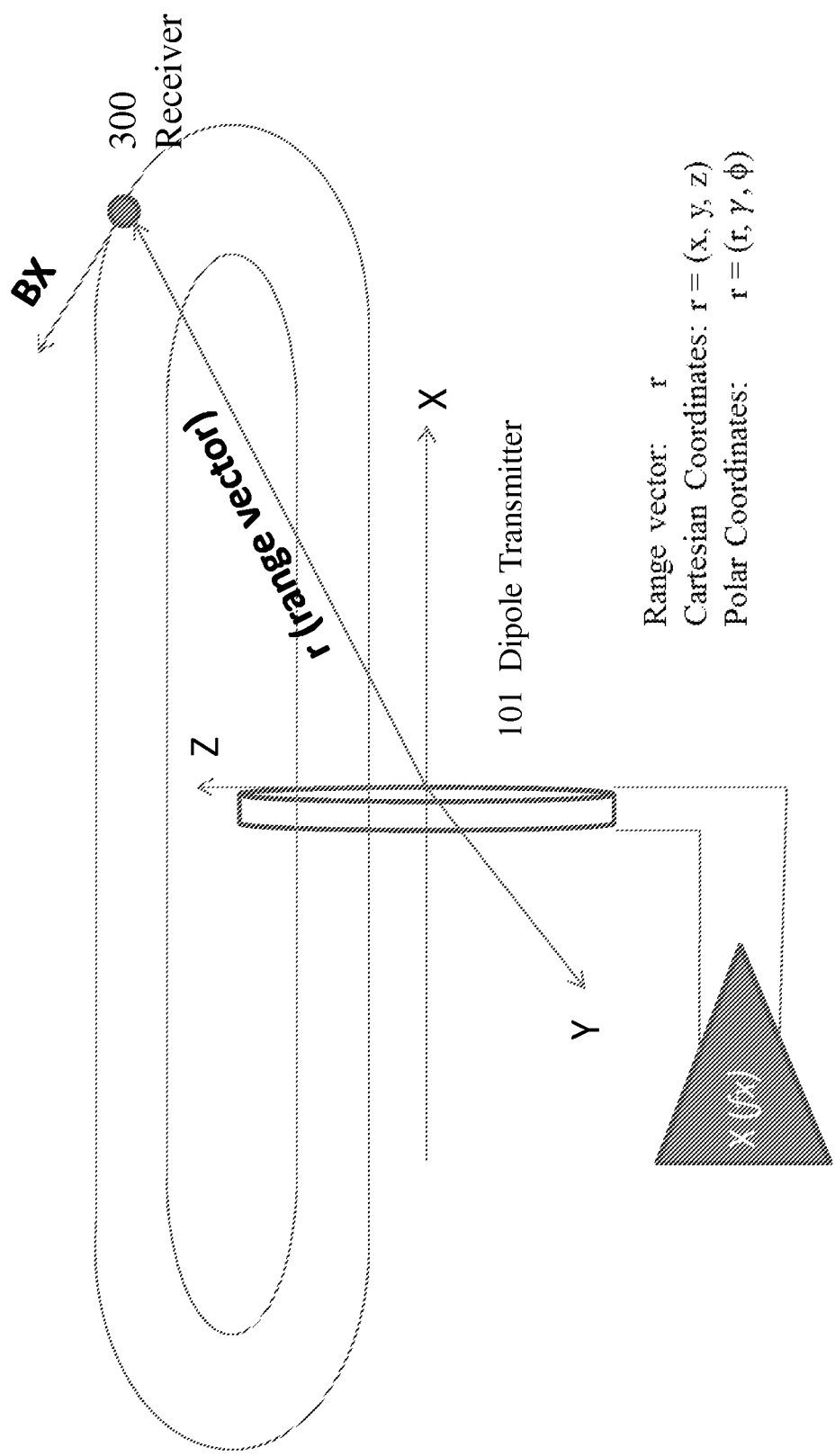
FIGS. 1A and 1B show Transmitter Dipole, Field Pattern, Equation, and Coordinate Frame of an embodiment of the disclosed invention.
Figure 1B:
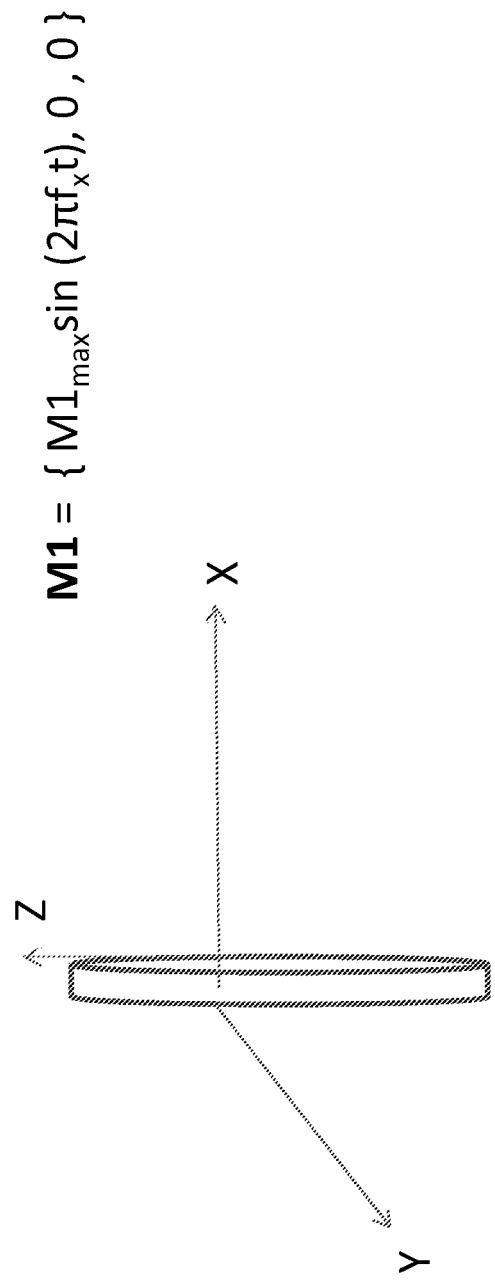

In some embodiments a disclosed transmitter includes one or more mounted magnetic dipole transmitter(s) 101. Each dipole transmitter generates a magnetic field pattern from driver and coil assembly 110; an exemplary spatial vector magnitude M1 is shown in FIG. 1. In some embodiments, this generated field is a time-varying, magnetic field signal with zero-mean, such as a standard AC waveform or other zero-mean time modulated pattern; the Field pattern in FIG. 1A is the RMS i.e., vector magnitude value. One preferred construction and operational parameters of each dipole is described in detail later. One dipole 101 of FIG. 1A enables the measurement of the range between receiver 300 to transmitter 101; the one dipole configuration is useful for applications such as detecting and locating people as they enter or exit a door way or where simple proximity detection is required. It is worth noting, that this technique for proximity detection is novel as it provides substantial benefit compared to RF techniques. RF proximity measurement techniques suffer from multi-path errors and have unpredictable fall-off and fading characteristics making a range measurement unreliable with accuracies reported in literature as low as from 1 meter to 10 meters with large standard deviation depending on specific implementation and installation details. A magnetic field vector gradient and propagation pattern however is much more reliable, hence allowing a more predictable and accurate proximity and range determination with accuracies of below 0.1 m routinely achievable. However, with a one-dipole transmitter, a receiver's actual position and unique orientation is indeterminate. When multiple one-dipole transmitters are located in the detectable vicinity of a receiver, then triangulation techniques to detect position are possible as described in historical publications. A useful, novel and efficient location system construction is to co-locate two or more dipoles in one transmitter. In some embodiments dipoles operate on distinct frequencies as described later. The operation on separate frequencies enables a receiver to easily distinguish the respective dipole transmitter signals and compute position and orientation information. When two dipoles mounted perpendicular are utilized, then the two axis position and one angle of the receiver can be computed. In a typical indoor application, a position measurement would be the X, Y, also referred to as latitude/longitude or grid location, and the heading or azimuth angle to a transmitter. In many applications, this configuration will be sufficient as the Z-position (i.e., altitude) and Roll/Pitch of the receiver is not critical and/or it is easily obtained from alternate methods such as a barometer for altitude and accelerometers or a combination of accelerometers and gyros for roll and pitch. Applications where Z-position is not critical include tracking a person for navigation, such as providing walking directions, purposes at ground level, or when additional transmitters are located on each level of a building. When three dipoles are co-located in a transmitter, then the receiver's X, Y, and Z position as well as the full three axis orientation signals Roll, Pitch, and Heading are determinable from a single transmitter. FIG. 1B defines a LEVEL Reference Frame for a transmitter dipole wherein the X, Y, Z Axis of a dipole is defined as the LEVEL Reference Frame and BX, BY, and BZ are each vectors with components on the X, Y, Z axes. This full implementation allows for a receiver's full position and orientation to be determined from a single transmitter installation. This is useful in cases when altitude information is desired and/or when a location system is used to correct drift and estimate errors in a receiver's inertial navigation system in all axes.

Each magnetic dipole antennae in a transmitter consists of a specially designed coil and associated processing and control electronics. See FIG. 2. In some applications, control electronics are connected to a wide-area network such as the Internet or are telephonically enabled. The configuration of each coil of the disclosed invention is a wound magnetic dipole and its properties are governed by the Biot-Savart Law. A current waveform is injected into each coil and a resulting magnetic field peculiar to the waveform is generated. The magnetic field produced by a coil has two components, a near-field component that is a cubic function of the distance from a transmitter, and a far-field component that is a linear function of the distance from a transmitter. In some embodiments a coil will be operated at frequencies in the audio band, which is in the low frequency of operation of a magnetic dipole transmitter. Hence the far-field component of the magnetic field is negligible and not important to the operation of the system. The near-field signal strength is given by the following formula which serves as the basis for coil sizing and design.

$$B = \frac{\mu_0 I N R^2}{2(R^2 + z^2)^{\frac{3}{2}}} \quad (1)$$

B: Magnetic Field Strength, T, Tesla

R: Radius of coil, m, meters z: distance along the Primary Axis of coil, m, meters $\mu_o$: Magnetic permeability in a vacuum, $4\pi \times 10^{-7}$, (T*meters/Amps) or (Tm/A)

N: number of coil turns

I: current, Amps, A

The sizing of the parameters of the coil relates to both the desired range of operation of a transmitter, transmitter size/power, and the sensitivity/noise level of magnetic sensors used in the receiver device. In some embodiments a range of 20 meters is desired, and the receiver is assumed to be anisotropic magnetoresistive, AMR, type magnetic sensors commonly available in today's "smart-phone" cellular handsets. There is however a wide range of magnetic field sensors available today with various sensitivities, and significantly greater range can be achieved if higher-performance sensors are used.

These include in order from most sensitive to least:

| Magnetometer Technology | Minimum Detectable Field |
|---|---|
| SQUID magnetometers | 10ρ Gauss |
| Magneto-inductive | <1µ Gauss |
| Flux-gate magnetometers | 1µ Gauss |
| AMR magnetometers | 10µ Gauss |
| Hall magnetometers | 200µ Gauss |

Any of these magnetometers is acceptable with the disclosed MMND (modulated-magnetic-navigation-dipole) invention as they have appropriate measurement range, frequency response, and noise characteristics to make practical receivers. AMR magnetometers are well established in high-volume production, and in many present models of smartphones, with sensitivities improving regularly and scalable down to below 20 µGauss. In some embodiments, a cell phone or smart phone is used as a receiver. As AMR magnetometers are commonly installed in these devices, operation at a 20 µGauss or worse resolution is described. AMR sensors have a typical maximum measurement range of 2-10 Gauss. Note, use of Flux-gate or magneto-inductive magnetometers, which are also small and low-cost, increases the range of described embodiments by more than 2-3 times.

With respect to a transmitter coil, a coil that is easy to install is preferred. In order to minimize size of coil, relatively high current operation is recommended, limited only by the desire to minimize power consumption and heat generation. In some embodiments additional design parameters of a 10 cm radius coil, with 100 turns of appropriate gauge wire, and an operating current of 20 Amps were found to be suitable. Using these parameters, transmitter power equals the noise floor of an AMR magnetometer at a range of approximately 20 meters (15 µGauss), ensuring adequate range in many applications. This field gradient (max field to min field variation in the operating region) is also compatible with the standard measurement range of AMR magnetometers in present consumer products. In some embodiments a transmitter is located in a ceiling or elevated above a floor and away from users, as the field strength at the very near the (<1-10 cm) transmitter location is higher than measurement range of magnetometers. Operating power consumption is both static and dynamic. Static power consumption of a transmitter is determined from the resistive power loss in the coil. In an ideal world, coil resistance is minimized to restrict power consumption; however, reduced resistance results in increased weight and cost of a transmitter coil due to larger diameter wire required to reduce ohmic resistance. In some embodiments using 16 AWG wire, a resistance of 0.5 Ohms is achieved for the above described coil, assuming sinusoidal excitation and minimal inductive effects, the power consumption of this transmitter coil is less than 100 Watts ($\frac{1}{2}I^2R$) or equivalent or less than a standard light bulb, ensuring a transmitter of this design can be powered by standard AC circuits in buildings. The inductance of the described coil is approximated at 3 mH. Inductance can be calculated ($\mu*A*N^2$/Height) or empirically measured. Larger coils will have a higher inductance, smaller coils lower. The L/R time constant in this embodiment is 12 milli-seconds (ms), allowing for Frequency Modulation in the lower portion of the audio band to be practical. Frequency or other modulation schemes allows the transmission of data in addition to being a location reference signal.

In order to provide an increase in accuracy, ease computational burden of position and orientation, and give a unique identity to each transmitter, the frequency of each respective X 101, Y 103, Z 105 coil is distinct. Additionally, in some embodiments the frequency is variable by the transmitter coil electronics, optionally at the direction of a control server as shown in Transmitter Block Diagram, FIG. 2; optionally by alternative means. Distinct X, Y, Z transmitter frequencies referred to as fx 110, fy 112, and fz 114 enable a receiver to quickly determine the transmitter ID, separate possible interference from other nearby transmitters and compute position and orientations. In addition, transmitted signals may be encoded with additional information, using standard frequency modulation 120 or other more sophisticated frequency based modulation techniques, optionally requiring a CPU 122; information can be recovered in a receiver 300. In some embodiments frequency of operation is from about 100 Hz-10 KHz; optionally, both higher and lower frequencies may be used; in some embodiments frequency of magnetic modulation is done above 1 KHz, optionally, above 10 KHz, to improve communication speed. High frequency operation allows for less sensitivity to magnetic materials in walls and environment, as well as faster data response time as explained later. However, high frequency operation requires more frequent sampling of the magnetic sensors in the receiver device, and more power consumption and overhead in the receiver. It is worth noting that AMR sensors described have bandwidth of over 1 MHz, so the frequencies contemplated here are well within the range. If other sensors are used such as Fluxgates or SQUIDS, these may have less bandwidth and therefore require a transmitter to operate at the low end of its frequency range. FIG. 2 shows a block diagram of an exemplary, complete, three axis transmitter 100; a transmitter of fewer axes of the sensors can be utilized with corresponding reduction in functionality or accuracy. Additional sensors 124, such as accelerometers, altimeters and/or gyroscopes may be included in transmitter 100 or receiver 300.

In some embodiments a transmitter remains fixed in its installed location; its corresponding location is stored in a receiver table accessible by all receivers. A receiver table may include transmitters X, Y and/or Z operating frequencies and power, transmitters latitude, longitude, and altitude information and other data as needed or of interest to by a prospective user. In some embodiments receiver information may be obtained at installation using a GPS receiver or a map/blueprint of the installation location. As a further improvement, a transmitter may have a network connection, such as the Internet, using standard wired or wireless techniques. Using an internet or other type connection, operating frequencies and power levels of a receiver can be updated remotely. In addition, when a transmitter is further modulating a data signal on the dipole, the content of the information can be prescribed by another remote computer by communicating the information to the transmitter over the Internet or other network connection as shown in FIG. 2; as used herein "network/internet/cloud" is intended to mean some functional combination of a localized network, a world-wide-web network and a cloud based service and/or network involving one or more of these entities. In some embodiments, a transmitter may comprise an accelerometer or other motion sensor; when a transmitter is moved without update to a location table, this transition condition may be autonomously detected preventing receivers from incorrectly computing their position information. In the event of an earthquake or other motion causing event a transmitter may send out a message with event specific data.

Receiver

Figure 3:
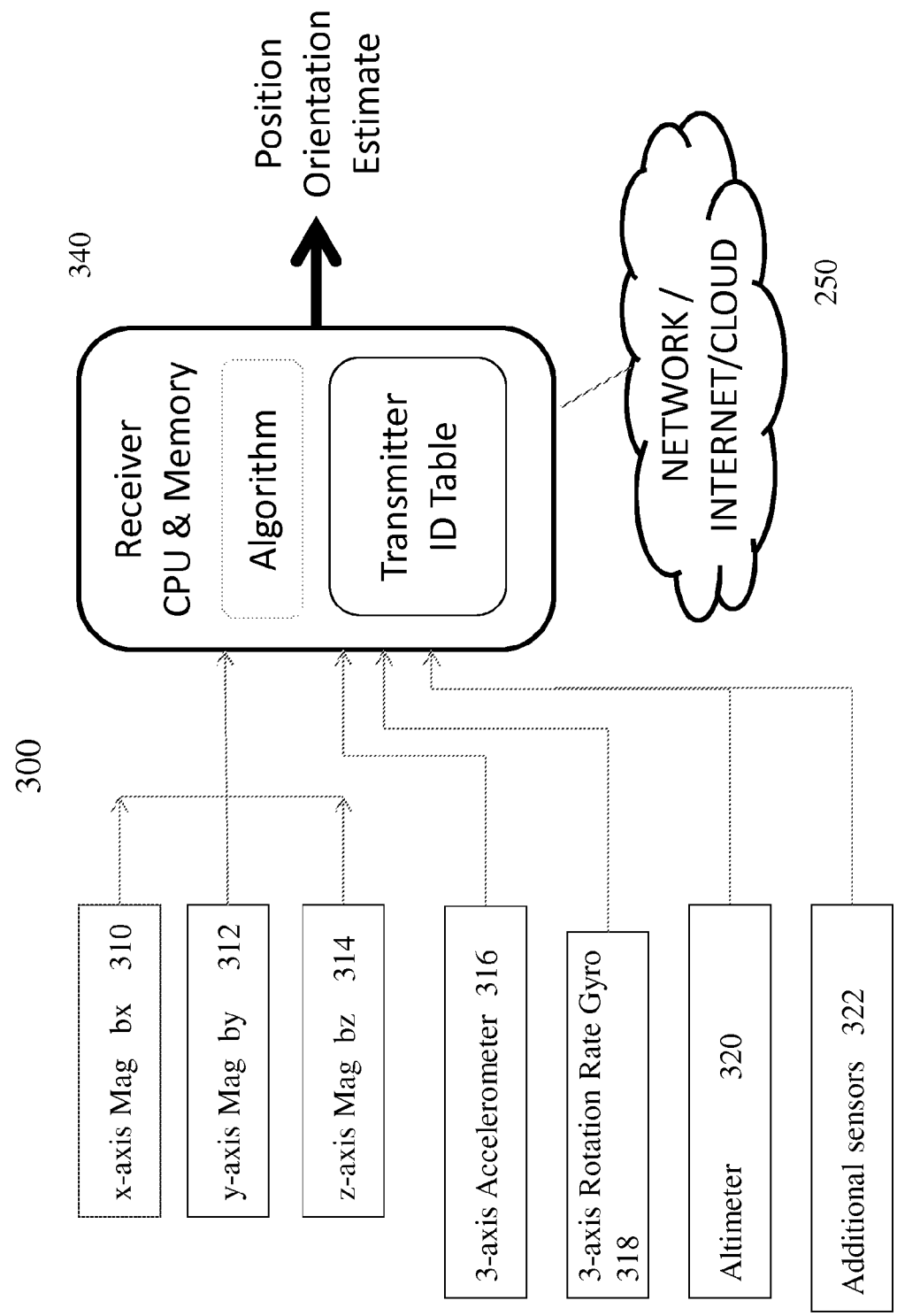
FIG. 3 is a Receiver schematic diagram.

The receiver 300 comprises a magnetic field sensor, optionally, one 310, two 312 or three 314, optionally orthogonal to each other, mounted, optionally, single axis magnetic sensors, optionally coupled to a processor via an A/D converter or connected directly when the sensors are digital. Magnetometer 310 provides Mag[bx] signal; magnetometer 312 provides Mag[by] signal; magnetometer 314 provides Mag[bz] signal; FIG. 3 shows an exemplary block diagram for receiver 300 comprising, optionally, a CPU, memory, software algorithms, transmitter ID table, network connection, altimeter 320 and additional sensors 322. In some embodiments, a receiver also contains a three axis or three, optionally orthogonally, mounted accelerometers 316 and/or a three axis or three orthogonally mounted gyros 318. These additional sensors assist in navigation when out of range of a dipole and also enable computation of the receiver's orientation more efficiently. In some embodiments a receiver has a CPU and memory for storing software used to compute the position and orientation of the receiver, as well as a table of dipole ID's, their key characteristics, and geographic coordinates in global coordinates such as latitude, longitude, and altitude. In some embodiments a receiver may have a network connection allowing a table of magnetic dipoles and/or position/orientation computation to be completed in the network, or cloud, as opposed to on a user's receiver device.

In some embodiments a first step in a processing chain of a receiver is to compute the FFT (Fast Fourier Transform) of received magnetic field signal(s) based on magnetic field sensor data stored on computer-readable media. The FFT is one convenient frequency separation algorithm and used in the description; however, other filtering or frequency analysis techniques can be used. As described in the transmitter section, in some embodiments each dipole operates on a separate frequency or emits signals in a manner distinctive to its identification. Separating the fields by frequency at the receiver, allows for quickly sorting the field caused by a respective X, Y, and Z dipole of a transmitter. In addition because each transmitter in a locality, locality being a specific geographic region, operates uniquely on a three frequency set, the FFT also enables the unique identification of the transmitter and/or perform a look up of the transmitter's characteristics such as transmitter power level, base geographic location and which transmitter reference axis corresponds to which frequency. When a receiver does not detect any transmitter frequencies in the spectrum, then it repeats a detecting step at a regular interval. When a receiver, is equipped with inertial sensors, the receiver may continue to update its position and orientation based on these sensors until it does detect a transmitter signal or beacon. In some embodiments of the instant invention magnetic signals sensed by the receiver are processed and stored as data on computer-readable media in the receiver; optionally, magnetic signals sensed by the receiver are processed and communicated to a location apart from the receiver and then stored as data on computer-readable media.

Range and Orientation of Receiver

This section describes a method of computing the position and orientation of a receiver for the most general three dipole case for some embodiments. Simpler solutions are also summarized for a two dipole embodiment and one dipole per transmitter embodiment. A computing step occurs once a receiver has identified one, or more, transmitters in range.

Range and orientation follow from the equations for vector magnetic fields produced by a transmitter's magnetic dipoles M1, M2 and M3 which point in three orthogonal directions, labeled as X, Y, and Z. In some embodiments a dipole ID has associated with it a set of correction factors for orthogonality, signal strength of the dipole; site location and characteristics and any other errors such as non-linearity, etc, which are measured in manufacturing. Each magnetic dipole produces a three dimensional magnetic field so M1 is a vector with scalar components M1X, M1Y, and M1Z respectively in Cartesian coordinates each transmitted on frequency fx. Alternatively, polar coordinates may be used in which case the MX vector is represented by a magnitude, azimuth, and elevation. See FIG. 1 for a graphical representation of a field pattern. A transmitter is established as the local LEVEL frame also called the stationery or fixed, frame of reference. This reference frame's exact geodetic location and orientation is established at the time of the transmitter's installation in some embodiments; in some embodiments location information is looked up using the transmitter's frequency as described earlier.

Figure 4:
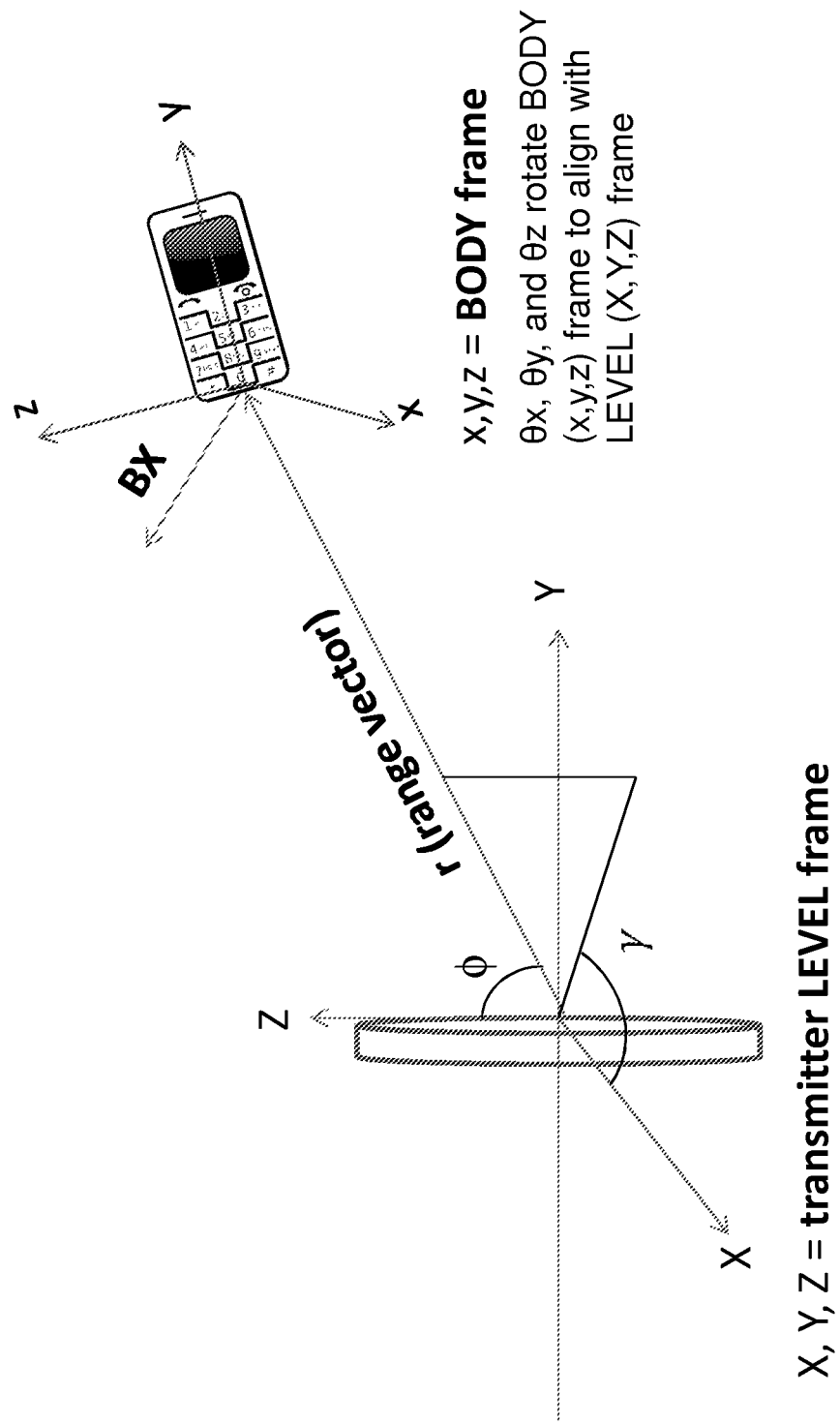
FIG. 4 is a block diagram of Receiver and Transmitter Coordinate Frame Transfer.

A receiver's reference frame is known as the body frame and is typically not stationary; see FIG. 4. The r vector extends from the origin of LEVEL frame to the origin of the receiver's body frame. The magnetic field vector at the device is termed B and is the vector sum of the vector field from each of the transmitter dipoles B=BX+BY+BZ, where each of BX, BY, and BZ are vectors fields due to the corresponding dipoles M1, M2, and M3. The magnetic field B is a function of transmitter dipole M and the range vector r from the level frame to the receiver body frame as follows. These are the fields in the LEVEL transmitter frame. However the device receiver is at an arbitrary orientation with respect to the LEVEL frame. First we write the dipole equations in the LEVEL frame of reference $$BX = \frac{3r(M1 \cdot r) - (r \cdot r)M1}{(r \cdot r)^{5/2}} \qquad (2)$$

$$BY = \frac{3r(M2 \cdot r) - (r \cdot r)M2}{(rr)^{5/2}} \qquad (3)$$

$$BZ = \frac{3r(M3 \cdot r) - (r \cdot r)M3}{(r \cdot r)^{5/2}} \qquad (4)$$

Next we consider the corresponding signals in the body-frame or frame of references of the magnetic sensors which can be at an arbitrary orientation with respect to the level frame as shown in FIG. 4. R is defined as the rotation matrix that describes the orientation of a device receiver frame or BODY frame with respect to the LEVEL frame. R is a rotation matrix created by rotating a body frame to the level frame through the rotational steps:

$$R=R(\theta x)R(\theta y)R(\theta z) \qquad (5)$$

The angles $\theta x$, $\theta y$, and $\theta z$ are known as the roll, pitch, and heading angles respectively. These rotational angles are generally unknown; however, in some implementations they may be known from a receiver's on-board accelerometers and gyro sensors for $\theta x$, $\theta y$ and an approximation of $\theta z$ may be had by using the receiver's magnetic sensors DC readings as a compass value. From this as described next, we derive Bx, By, and Bz vectors which are the components of the magnetic field from the transmitter's respective M1, M2, an M3 dipoles in the BODY frame. By using a FFT function we are able to separate each reading into frequency components due to the dipoles 1, 2, 3. As an example we measure a short time series along the body frame axis x, and compute FFT. We then have up to three magnitudes and polarity/phase which we shall call—bx(fx), bx(fy), and bx(fz). These signals are the energy on the x-axis body frame magnetic sensor developed by M1, M2, and M3 respectively. The phase information from the FFT represents the "polarity" of the signal. This process is repeated for the y-axis sensor and the z-axis sensor. We now create a new vector which has each of the three spatial components of the dipole for the receiver; Bx={bx(fx), by(fx), bz(fx)}. A way to think of this vector is to consider the sensor as frequency selective, so it only tuned into one dipole at a time. Once Bx, is computed from the sensor readings, the following relationships are constructed:

$$Bx=R \cdot BX \qquad (6)$$

$$By=R \cdot BY \qquad (7)$$

$$Bz=R \cdot BZ \qquad (8)$$

These expand to $$Bx = R(\theta x,\ \theta y,\ \theta z) \cdot \frac{3r(M1 \cdot r) - (r \cdot r)M1}{(r \cdot r)^{5/2}} \qquad (9)$$

$$By = R(\theta x,\ \theta y,\ \theta z) \cdot \frac{3r(M2 \cdot r) - (r \cdot r)M2}{(r \cdot r)^{5/2}} \qquad (10)$$

$$Bz = R(\theta x,\ \theta y,\ \theta z) \cdot \frac{3r(M3 \cdot r) - (r \cdot r)M3}{(r \cdot r)^{5/2}} \qquad (11)$$

Given Bx, By, Bz, M1, M2, and M3, the receiver solves for the rotation angles comprising R and the Cartesian or Polar coordinates of the range vector r. Each of these vector equations expands to 3 equations in scalar or polar form, yielding a total of 9 simultaneous non-linear equations and 6 unknown quantities, or roots. These equations can be solved in a variety of ways and the preferred solution methodology depends on whether a receiver has additional local accelerometer and/or gyro inertial sensors providing additional data regarding R, and whether the transmitter dipole is operated with the M1, M2, or M3 as orthogonal dipoles. Optionally, the dipoles need not be orthogonal however the mathematical analysis required to compute attitude and position is more complex in the non-orthogonal condition.

In order to gain perspective on the meaning and solutions to these complex equations, we start with the simplest case of 1-dipole and one axis magnetometer and range estimation and build up to the most complex case of 3-dipoles and solving for the 3-axis position information and orientation information. We consider both practical cases where the receiver has no local orientation information (obtained for example from the receiver's local sensors such as accelerometers or gyros) i.e., $\theta x$, $\theta y$, and $\theta z$ are unknowns to the receivers and also the case where $\theta x$, $\theta y$, and $\theta z$ estimates are known to the receiver. The benefits in each of the 1-axis, 2-axis, and 3-axis dipole case provide different benefits. The following Table 1 summarizes some of the possible configurations from this invention.

TABLE 1

| # of Dipoles | Additional Information Known by Receiver/ Location CPU | Solution | Comments |
| --- | --- | --- | --- |
| 1 | None | Estimate of Range | Up to 25% range error due to field curvature |
| 2 | None | Exact Range, X, Y position | |
| 3 | None | X, Y, Z, $\theta x$, $\theta y$, and $\theta z$ | Computationally intensive |
| 1 | $\theta x$, $\theta y$, and $\theta z$ | Exact Range | |
| 2 | $\theta x$, $\theta y$, (and $\theta z$) | X, Y Position, and $\theta z$ | It is not required to know $\theta z$. This method can be used to calibrate/improve accuracy of receiver's $\theta z$. |

TABLE 1-continued

| # of Dipoles | Additional Information Known by Receiver/ Location CPU | Solution | Comments |
|---|---|---|---|
| 3 | θx, θy, and θz | X, Y, Z, θx, θy, and θz | Computationally straightforward, and can be used to calibrate/improve accuracy in , θx, θy, and θz measured locally |

Note in Table 1 "Range" refers to the magnitude of the r vector. In the mathematical analysis we represent r in polar form for mathematical convenience see FIG. 1A. In the table, X, Y Position refers to computing the magnitude of r and the angle γ. X, Y, and Z position refers to computing the magnitude of r and both angles γ and φ.

1-Axis Dipole

In the case where only one dipole is used, only a range estimate computation is possible; the magnitude of the range vector can be computed analytically. If no orientation information is known ahead of time, the receiver has no additional sensors, the range to a first order can be estimated from the simplification of the fundamental dipole equation where.

$$r = (M/B)^{1/3} \quad (12)$$

Where M is given by the magnitude of the field in the center of the dipole core at zero range, and B is simply the root mean square of the magnetic energy at the transmitter frequency. However, due to the curvature of the field as shown in FIG. 1A, this approximation has an error when the receiver is at an angle to the radial line extended thru the dipole due to the curvature of the field lines. This error's maximum is $(2)^{1/3}$ or approximately 25%.

Additional enhancements are obtained when a receiver's sensor, optionally, accelerometers, compass readings of a magnetometer and/or gyroscopes are used to predetermine the orientation (θx, θy, and θz) of a receiver to a dipole coil. In these embodiments error is reduced and a more exact range estimate is computed, by solving for both the angle γ and r simultaneously. The first step is to take the received magnetic field from dipole one and using known θx, θy, and θz rotate those readings into the level frame computing what we will call Bx*. When all three rotation angles are approximately known Bx* and BX are essentially equivalent, only different by errors in the receivers sensors and errors in the known θx, θy, and θz. This is simply done by forming the rotation matrix and then computing its inverse. Rotation matrices have the unique property that the inverse matrix is the transpose. Then solve the subsequent two trigonometric equations simultaneously for r (magnitude) and γ. The γ is the curvature factor and removes the up to 25% error in the range error from above.

$$Bx = R(\theta x)R(\theta y)R(\theta z)BX \quad (13)$$

$$Bx^* = R^T(\theta z)R^T(\theta y)R^T(\theta x)Bx \approx BX \quad (14)$$

$$Bx^*(fx) = (3\cos^2\gamma - 1) * \left(\frac{|M1|}{r^3}\right) \quad (15)$$

$$By^*(fx) = 3\cos\gamma\sin\gamma * \left(\frac{|M1|}{r^3}\right) \quad (16)$$

The formation of rotation matrices from roll, pitch, and heading angles is known in the art, but repeated here for clarity.

$$R(\theta x) = \begin{bmatrix} 1 & 0 & 0 \\ 0 & \cos\theta x & \sin\theta x \\ 0 & -\sin\theta x & \cos\theta x \end{bmatrix} \quad (17)$$

$$R(\theta y) = \begin{bmatrix} \cos\theta y & 0 & -\sin\theta y \\ 0 & 1 & 0 \\ \sin\theta y & 0 & \cos\theta y \end{bmatrix} \quad (18)$$

$$R(\theta z) = \begin{bmatrix} \cos\theta y & -\sin\theta y & 0 \\ \sin\theta y & \cos\theta y & 0 \\ 0 & 0 & 1 \end{bmatrix} \quad (19)$$

2-Axis Dipole

In the case of a 2-axis dipole with known θx, θy, and θz, we can follow the exact same methodology as above and compute the range as described in the 1-axis cases, but repeat twice independently with sensor data from both dipoles M1 and M2 respectively. We can then average the range readings to improve accuracy. Furthermore, the 1-axis dipole case leaves ambiguous which quadrant the r vector is pointed in. Although we know the angle γ, we are ambiguous as to which side of the dipole we are on as the field is entirely symmetric in the horizontal plane, hence we can't determine the X and Y position relative to the coil without ambiguity. However, In the case of 2-axis coil we compute γ with respect to the coils M1 and M2 which are 90 degrees separated. Hence the ambiguity is removed, and a complete solution for X and Y is determinable. Alternatively we can remove the requirement to know θz, and solve for θz analytically with a few additional steps. As before, the first step is use the known roll and pitch variables to rotate the previously described Bx into the level frame, this time however the final θz rotation remains unknown.

$$Bx = R(\theta x)R(\theta y)R(\theta z)BX \quad (19)$$

$$Bx^* = R^T(\theta y)R^T(\theta x)Bx = R(\theta z)BX \quad (20)$$

The quantity $R^T(\theta x)R^T(\theta y)Bx$ is the original Bx vector simply multiplied by known matrices and results in a new 3×1 vector, which we again call Bx*. In this case Bx* and BX differ by the rotation about θz as well as any errors in the receivers estimate of θx, θy and any other receiver sensor errors. The same series of steps is also done for the measured By and a resulting By* is computed. In the two dimensional case the z-component is dropped from the analysis and the core equations become $$Bx^* = R^T(\theta x)R^T(\theta y)Bx = R(\theta z)BX = R(\theta z)\frac{3r(M1 \cdot r) - (r \cdot r)M1}{(rr)^{5/2}} \quad (21)$$

$$By^* = R^T(\theta x)R^T(\theta y)By = R(\theta z)BY = R(\theta z)\frac{3r(M1 \cdot r) - (r \cdot r)M2}{(r \cdot r)^{5/2}} \quad (22)$$

In order to solve these equations analytically we need to expand these out of vector notation into simultaneous equations. This can be more easily done in polar notation, so we again introduce the angle γ between M1 X-fixed frame axis and the range vector r. Note γ is the azimuth angle of the r-vector, it is not the azimuth angle θz of the receiver's z-axis with respect to the level frame axis. The angle between r-vector and the Y-fixed frame axis is γ−π/2, as mentioned before it is the same γ just shifted by 90 degrees. After manipulation of the four equations, a set of two key relationships is determined. The relationship relates the magnitude of the field from M1 received at the receiver and the magnitude of the field from M2 received at the receiver to the distance magnitude and γ, independently of the body-to-level frame heading angle θz. This allows the receiver to solve for γ and the magnitude of r, and then separately solve for θz.

$$(Bx^*)^2 = (Bx^*(fx))^2 + (By^*(fx))^2 = (1 + 3\cos^2\gamma)\left(\frac{M1}{r^5}\right)^2 \quad (23)$$

$$(By^*)^2 = (Bx^*(fy))^2 + (By^*(fy))^2 = (1 + 3\sin^2\gamma)\left(\frac{M2}{r^5}\right)^2 \quad (24)$$

From the relationships we define a helper function, F.

$$F(\gamma) = \frac{1 + 3\cos^2\gamma}{1 + 3\sin^2\gamma} = \frac{\left(\frac{Bx^*}{M1}\right)^2}{\left(\frac{By^*}{M2}\right)^2} \quad (25)$$

The helper function, F, is used to numerically solve for γ. This is a one to one equation that varies from 4.0 to 0.25 as a function of γ. The right hand side quantities of Bx*, M1, By*, and M2 are all known quantities (the magnitude scalar value of their corresponding vectors), γ is determined by simple 1-dimensional iteration or a table look-up. Once γ is solved then using either of the above equations (23, 24) the magnitude of range r-vector can be computed accurately. Finally from γ and r, we can solve for the azimuth angle θz, we return to the following equation:

$$Bx = R \cdot BX \quad (26)$$

where R is the R(θz) rotation matrix. In expanded form, this is as follows $$\begin{bmatrix} Bx^*(fx) \\ By^*(fx) \end{bmatrix} = \begin{bmatrix} \cos\theta z & -\sin\theta z \\ \sin\theta z & \cos\theta z \end{bmatrix} \begin{bmatrix} BX(fx) \\ BY(fx) \end{bmatrix} \quad (27)$$

Where BX(fx) and BY(fx) are the first and second components are of known value, the value is derived from the original dipole equation:

$$\frac{3r(M1 \cdot r) - (r \cdot r)M1}{(r \cdot r)^{5/2}} \quad (28)$$

The matrix equation (27) is also straightforward to solve for θz. The same equation can also be written for BY. (By=R·BY). A second solution for θz can be computed. The two independent measurements of θz can be averaged or weighted based on noise level for enhanced accuracy.

3-Axis Dipole

The three axis Dipole case follows the same pattern as the two axis case, except that we are able to solve for the additional dipole angle φ shown in FIG. 1A. This allows for the removal of ambiguity in the Z-axis or height dimension. Again there are two cases, the case of known θx, θy, and θz and the case of unknown θx, θy, and θz. In the case of known θx, θy, and θz, quantities Bx*, By*, and Bz* are each computed as described before. Similarly a set of equations relating the total field strength (i.e., squared-magnitude i.e., (Bx*)², (By*)², and (Bz*)² from each dipole to r, γ, and φ are obtained. In the event of unknown, θx, θy, and θz, a two step process similar to the two axis case is again repeated. A set of three magnitude equations is developed with (Bx*)², (By*)², and (Bz*)² same as before. These equations are dependent only on r, γ, and φ, and independent of θx, θy, and θz. These three equations are solved. Then as before the level frame BX, BY, and BZ vectors are computed using the dipole equations and the now computed r, γ, and φ. The remaining unknown is the R matrix which is a function of θx, θy, and θz. This is a set of trigonometric equations which can be solved with standard techniques such as the Method of Steepest Decent or other root finding solutions. It is also worth noting that in the case of known θx, θy, and θz, the method can still be applied using the known θx, θy, and θz as a seed solution, and an enhanced accuracy θx, θy, and θz can be computed using Method of Steepest Decent.

System Considerations

In some embodiments a user with a receiver enters a location wherein a transmitter of a MMND based location system is operable. The entered location may be known to the receiver based upon knowledge of the user's previous location sent to the receiver by a MMND location service, via the internet, or other wired or wireless means. The transmitter may activate based upon the transmittal of the user's location and communicate via a coded, optionally, magnetically based, signal to the receiver; optionally, a receiver may transmit a signal to the transmitter and initiate communication; optionally, the transmitter may be signaling at some interval based upon internal or external instructions. In some embodiments signals from the transmitter enable a receiver and/or the location system to calculate a range and/or orientation of the receiver relative to the transmitter on a static or dynamic basis and communicate information of interest to the user. Information of interest may comprise location, orientation, retail locations, food locations, or other data as requested by the user.

In some embodiments, where the desire is for accurate positioning in a very small area, such as locating or identifying small objects on a board or video game or identifying a unique game token, a location system may be operated such that the transmitter is non-stationery and the receiver(s) are stationery. A receiver detects the transmitter, looks up its dipole ID to determine only the reference transmitted field strength, and then computes the distance and orientation from the fixed receiver to the mobile transmitter. The choice of whether the transmitter is stationery or receiver is stationery is optional determined by utility or convenience. However, as the transmitter requires significantly greater power to operate than the receiver, in some embodiments the transmitter is fixed and connected to available power.

In some embodiments a Magnetically Modulated Location System, MMLS, is optimized for a gaming system; a Magnetically Modulated Location System, MMLS, is characterized by a MMND (modulated-magnetic-navigation-dipole). A user attaches, or wears, one or more receivers, optionally transmitters, on various locations of his body or clothes. A fixed base station, optionally part of the gaming system, normalizes on nominal signal(s) as transmitted by the user in a predetermined position. Optionally a user may execute a predetermined set of motions for self-calibration purposes. Optionally a user's motions are displayed on a screen in coordination with various activities also displayed on the screen such as tennis or bowling or golf or other activities known to one knowledgeable in the field. The base station receives signals as transmitted by the user's receivers, optionally transmitters, and converts the magnetically modulated information into body motion of an avatar on the display screen replicating the body motions of the user. Optionally there is more than one user and/or more than one avatar.

In some embodiments a Magnetically Modulated Location System, MMLS, is optimized for a gaming system wherein there are multiple receivers and/or transmitters in proximity on a user and a sports apparatus comprises one or more receivers and/or transmitters attached thereto. In some embodiment a user may be holding a golf club or tennis racket or other sport apparatus such that the motion of a user and associated sport apparatus is tracked by a gaming or training system.

In some embodiments a Magnetically Modulated Location System, MMLS, is optimized for control of one or more robots in a predetermined area. In some embodiments a robot comprises at least one receiver and/or transmitter and a base station comprises at least one receiver and/or transmitter; optionally, a robot and base station comprise additional means for communication such that the base station determines the location of the robot within the predetermined area and instructs the activities of the robot based on the location information; optionally, additional receivers and/or transmitters are located advantageously about the predetermined area.

In some embodiments a Magnetically Modulated Location System, MMLS, is optimized for location tracking of an individual, pet or object within a predetermined area or region. The designated individual, such as a child, has a receiver and/or transmitter attached such that his whereabouts may be tracked within a house or building or area of interest. In some embodiments when the designated individual moves into an area previously designated an alarm may result at a base station or on a "tracking person" or elsewhere. In some embodiments a "designated individual may be an animal or an object such as a painting or automobile or other item of interest. In some embodiments a parent or person carries or wears a "base station" of a location monitoring system and a child or elder person is the "designated individual". In some embodiments an entry and/or exit point comprises a base station of a Magnetically Modulated Location System, MMLS, optimized for tracking persons and/or objects crossing the entry/exit point wherein persons and/or objects crossing comprise a magnetically modulated enabled transmitter or receiver coded with information specific to the person and/or object. In some embodiments an entry and/or exit point base station comprises a means to communicate its exact geographic location, including other information, to a person or object in the vicinity of the base station such that the person or object may update, optionally, correct, his or its geographic location.

It is noted that improvements in magnetic signal generation and detection are ongoing such that the disclosed embodiments may be operable at distances of 500 meters or more between a receiver and/or transmitter and/or a base station. For example, improvements in coil wire resistance to values less than 0.1 Ohm for a 1,000 meter wire length capable of carrying 10 amps at reasonable weight and cost, enables much stronger magnetic signals from a transmitter for similar or lower power consumption. Similarly, improvements in magnetic field strength detection to values less than 1 nano-Gauss enables detection of weaker magnetic signals by a receiving device increasing range by an order of magnitude (10×) to 500 m or more, versus today's low-cost AMR type magnetic sensors.

Set-Up and Communications Protocol

Figure 6:
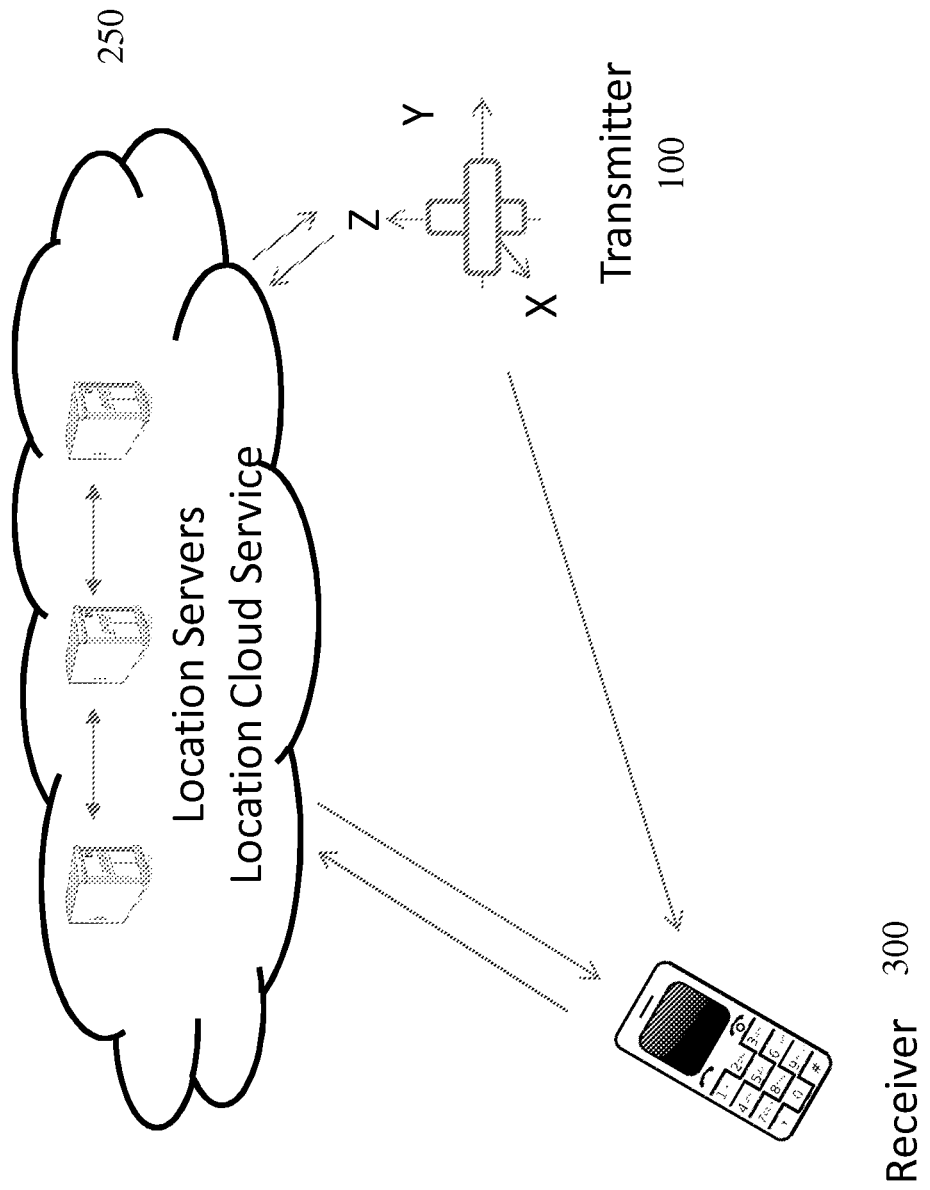
FIG. 6 shows exemplary network topology for communicating among receiver, transmitter and network, internet and cloud.

In another aspect of the instant invention comprising a collection of network-connected transmitters (TXR), network-connected servers, holding location reference tables and communicating with both receivers and transmitters, and network-connected mobile receiving devices (MRD). This networked collection of devices and systems work together in a coordinated and distributed protocol, providing a reliable high-accuracy positioning service or, as used herein, a location network service (LCS). FIG. 6 shows a simplified network diagram comprising receiver 300, transmitter 100 and network 250. FIG. 7 is an exemplary method for a communication protocol among communicating devices and systems of the instant invention.

In some embodiments transmitters are connected to the network wide service via a traditional Ethernet, power-over-Ethernet, Wi-Fi, or other traditional networking means. At installation time, the transmitter is configured with self-location information with the highest accuracy reasonably or cost effectively possible. One method of accurate installation is to use a traditional map, a building blueprint or other map/grid system to identify a location precisely and configure the specified transmitter. Automatic location means such as GPS can also be used. However to use GPS for installation, a differential receiver GPS may preferentially be used. In accordance, a differential GPS base station must be surveyed into an area nearby the installation site prior to installation of the transmitter. Differential GPS removes the ionospheric based distortion in the GPS signals by correlating signals from two GPS receivers, at least one from a high-accuracy reference installation. Using a differential GPS receiver the transmitter can determine its location to within 10 centimeters or better provided satellite reception is available. Once the location information is configured and verified in the transmitter, the beacon communicates this information using a secure key or password to the location network service (LCS). This process of communication is the registration step. Once registered, the LCS communicates the transmitter frequency, transmit data beacon code (optional) and transmit interval to the TXR. Using the secure/key and password these datums are periodically changed to prevent spoofing of the transmitter. The LCS also propagates the beacon information to the other LCS servers that form a distributed redundant network of location information services connected to the Internet. When computing the frequencies and optional beacon code, the LCS ensures that there are no-conflicts in the local proximity in order to prevent interference. The local proximity can be defined in relevant terms to the implementation; for example, in the case of a mobile phone-based receiving device the local proximity boundary may be set to the range of a singular cellular tower. As the mobile phone device prior to receiving information from the transmitter, knows its location information to within the accuracy of the mobile-phone tower range, conflicting beacons outside the radius of the tower to which the mobile-receiver is connected pose no possibility of interference or location ambiguity. This example is illustrative. The registration of additional transmitters onto the location services network repeats this process. The registration process is dynamic and on-going meaning that at anytime the LCS network and protocol can accept new transmitters without impacting the operation of the overall network system. When the LCS updates the transmitter datums, this information is automatically propagated to other location servers and optionally to receivers.

In some embodiments prior to using a given location network service, a receiver is configured with the IP or other network address(es) of the location service. A mobile device is not required to be formally registered with the network as the transmitter is, but a mobile device can issue a test message or ping message to ensure connectivity. A user can also optionally periodically request a download of nearby location table information from the network in case of network access loss and can also register for beacon table updates. For example, if a receiver has an up-to-date beacon location table when entering into a subway station where wireless signals may not propagate but precise location is still required, then the receiver is able to continue to receive service from the location network service (LCS) while temporarily not being connected to it. In a further improvement to ensure the privacy of a mobile receiver, the mobile receiver may use an alias in its configuration. A server accepts the alias as the requestor but is unable to identify the user's identity or other specific information of the user or the receiver. The LCS therefore responds to all of the location service requests in a blind fashion. This step prevents the unwanted distribution of user location information or possible attack on the location service network inadvertently distributing user location information.

Once the location network service (LCS) is configured on the receiver, the mobile receiver devices periodically listen to their sensors for an interval as described in the proceeding sections. The listening interval must overlap the longest transmit beacon interval to ensure there is overlap between transmitter and receiver. Periodic listening and receiving reduces power consumption for the receiver and also transmitter. During a listening interval if a transmitter is detected, the data from the transmitter is collected. The data is analyzed according to the previously described method. The data is either analyzed locally at the receiver using a downloaded beacon table or the collected information is communicated to the location network service for analysis. In the event the network location service provides the analysis, the position information communicated by the location service is optionally transmitted back to the mobile receiving, optionally, using the alias for receiver display/use.

In some embodiments a location system characterized by a magnetically modulated signal comprises a transmitter comprising a means for generating a magnetically modulated signal; a receiver comprising a magnetometer to sense the magnetically modulated signal such that a range from the transmitter to the receiver is estimated based upon the sensing of the magnetometer; optionally, the means for generating a magnetically modulated signal is operable to transmit information encoded in the magnetically modulated signal; optionally, the information encoded in the magnetically modulated signal is done so with frequency modulation of the magnetic field; optionally, the means for generating a magnetically modulated signal is chosen from a group consisting of electronically controlled magnetic dipoles, electromagnetic dipoles, and electronically modulated magnetic cores; optionally, the information encoded in the magnetically modulated signal is done so with a first and a second frequency wherein the first frequency is different from the second frequency; optionally, the first frequency corresponds to a one and the second frequency to a zero for purposes of information encoding; optionally, the transmitter comprises a first and second means for generating a magnetically modulated signal such that the magnetic axis of the first means for generating a magnetic signal is substantially not parallel to the magnetic axis of the second means for generating a magnetic signal.

In some embodiments a method for a receiver of a location system characterized by a transmitter transmitting a magnetically modulated signal to determine the location of the receiver relative to the transmitter comprises the steps: sensing the receiver's magnetic field comprising the transmitted magnetically modulated signal; applying a frequency conversion algorithm to the sensed magnetic field data such that frequency components of the magnetically modulated signal are identified; solving for location data; and communicating the location data; optionally, the communicating is to at least one of a user, a local network, a base station and an internet access point; optionally, the data in the receiver's sensed magnetic field data comprises at least one chosen from a group consisting of transmitter identification, fx, fy, fz, Bx, By, and Bz; optionally, the method for a receiver further comprises the step of mapping the magnetic field data to a body frame of the receiver; optionally, the magnetically modulated signal transmitted comprises at least two different frequency components in a predetermined pattern such that predetermined information is encoded in the predetermined pattern.

In some embodiments a location system characterized by a magnetically modulated signal comprises: a transmitter comprising a first means for generating a magnetically modulated signal at a first frequency such that information may be encoded in the magnetically modulated signal; and a receiver comprising a first magnetometer sensor operable to sense the magnetically modulated signal and a means for communicating the strength of the magnetically modulated signal to a processor wherein the distance from the receiver to the transmitter is estimated by the strength of the magnetically modulated signal; optionally, the information encoded in the magnetically modulated signal is the transmitter's location; optionally, the processor is located away from the receiver; optionally, the location system further comprises a base station comprising at least one of a transmitter and receiver and a means for processing a signal from at least one of a remote transmitter and a remote receiver such that estimates of the distance between the base station and the remote transmitter and estimates of the distance between the base station and the remote receiver can be made; optionally, the transmitter comprises a second means for generating a magnetically modulated signal at a second frequency; optionally, the receiver comprises a second sensor chosen from a group consisting of magnetometers, accelerometers, altimeters, GPS and gyroscopes such that location and orientation data of the receiver is sensed; optionally, the first frequency is greater than 1 kHz; optionally, the receiver is resident in a portable communication device; optionally, the location system is part of a location network service and the transmitter is registered with the location network service and the receiver may or may not be registered with the location network service.

It shall be recognized that the present invention, in whole or in part, may be suitable for use in all classes of digital systems including, without limitation: acquisition, processing, storage, communications, control, data, audio, graphics, photographic image, video, internet, cloud, network infrastructure, enterprise, business, financial, engineering, scientific, medical, industrial, military, aerospace, automotive, instrument, embedded, office, home, consumer, portable and mobile. Further, it shall be recognized that the present invention may be implemented in a circuit technology including, without limitation: MOS, NMOS, CMOS, bipolar, analog, TTL, ECL, GaAs, other semiconductor technologies and optical technologies. Further, it shall be recognized that the present invention may be implemented in any device class including, without limitation: custom, standard cell, mask-programmable gate array, field-programmable gate array, other programmable logic devices and discrete logic circuits.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the phrase "characterized by" is synonymous with "comprising" and "including"; "characterized by" as used is inclusive or open-ended and does not exclude unrecited elements or method steps. As used herein the phrase "substantially not parallel" is taken to mean within ±1° of a parallel orientation.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents and other references mentioned herein are incorporated by reference in their entirety.

I claim:

1. A location system characterized by a magnetically modulated signal comprising;
   a transmitter comprising a means for generating a magnetically modulated signal;
   a receiver comprising a magnetometer to sense the magnetically modulated signal such that a range from the transmitter to the receiver is estimated based upon the sensing of the magnetometer.

2. The location system of claim 1 wherein the means for generating a magnetically modulated signal is operable to transmit information encoded in the magnetically modulated signal.

3. The location system of claim 2 wherein the information encoded in the magnetically modulated signal is done so with frequency modulation of the magnetic field.

4. The location system of claim 1 wherein the means for generating a magnetically modulated signal is chosen from a group consisting of electronically controlled magnetic dipoles, electromagnetic dipoles, and electronically modulated magnetic cores.

5. The location system of claim 3 wherein the information encoded in the magnetically modulated signal is done so with a first and a second frequency wherein the first frequency is different from the second frequency.

6. The location system of claim 5 wherein the first frequency corresponds to a one and the second frequency to a zero for purposes of information encoding.

7. The location system of claim 5 wherein the transmitter comprises a first and second means for generating a magnetically modulated signal such that the magnetic axis of the first means for generating a magnetic signal is substantially not parallel to the magnetic axis of the second means for generating a magnetic signal.

8. A method for a receiver of a location system characterized by a transmitter transmitting a magnetically modulated signal to determine the location of the receiver relative to the transmitter comprising the steps:
   sensing the receiver's magnetic field comprising the transmitted magnetically modulated signal;
   applying a frequency conversion algorithm to the sensed magnetic field data such that frequency components of the magnetically modulated signal are identified;
   solving for location data; and
   communicating the location data.

9. The method for a receiver of claim 8 wherein the data in the receiver's sensed magnetic field data comprise at least one chosen from a group consisting of transmitter identification, fx, fy, fz, Bx, By, and Bz.

10. The method for a receiver of claim 8 further comprising the step of mapping the magnetic field data to a body frame of the receiver.

11. The method for a receiver of claim 8 wherein the magnetically modulated signal transmitted comprises at least two different frequency components in a predetermined pattern such that predetermined information is encoded in the predetermined pattern.

12. A location system characterized by a magnetically modulated signal comprising:
    a transmitter comprising a first means for generating a magnetically modulated signal at a first frequency such that information may be encoded in the magnetically modulated signal; and
    a receiver comprising a first magnetometer sensor operable to sense the magnetically modulated signal and a means for communicating the strength of the magnetically modulated signal to a processor wherein the distance from the receiver to the transmitter is estimated by the strength of the magnetically modulated signal.

13. The location system of claim 12 wherein the information encoded in the magnetically modulated signal is the transmitter's location.

14. The location system of claim 12 wherein the processor is located away from the receiver.

15. The location system of claim 12 further comprising a base station comprising at least one of a transmitter and receiver and a means for processing a signal from at least one of a remote transmitter and a remote receiver such that estimates of the distance between the base station and the remote transmitter and estimates of the distance between the base station and the remote receiver can be made.

16. The location system of claim 12 wherein the transmitter comprises a second means for generating a magnetically modulated signal at a second frequency.

17. The location system of claim 12 wherein the receiver comprises a second sensor chosen from a group consisting of magnetometers, accelerometers, altimeters, GPS and gyroscopes such that location and orientation data of the receiver is sensed.

18. The location system of claim 12 wherein the first frequency is greater than 1 kHz.

19. The location system of claim 12 wherein the receiver is resident in a portable communication device.

20. The location system of claim 12 wherein the location system is part of a location network service and the transmitter is registered with the location network service and the receiver may not be registered with the location network service.

* * * * *